US009627117B2

(12) United States Patent
Petuskey et al.

(10) Patent No.: US 9,627,117 B2
(45) Date of Patent: *Apr. 18, 2017

(54) THIN FILM FERRITE LAMINATION (71) Applicant: ARIZONA BOARD OF REGENTS, Scottsdale, AZ (US)

(72) Inventors: William T. Petuskey, Phoenix, AZ (US); Nicole M. Ray, Tempe, AZ (US)

(73) Assignee: ARIZONA BOARD OF REGENTS, A BODY CORPORATE OF THE STATE OF ARIZONA ACTING FOR AND ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 96 days.

This patent is subject to a terminal disclaimer.

(21) Appl. No.: 14/354,409

(22) PCT Filed: Oct. 26, 2012

(86) PCT No.: PCT/US2012/062221
§ 371 (c)(1),
(2) Date: Apr. 25, 2014

(87) PCT Pub. No.: WO2013/063467
PCT Pub. Date: May 2, 2013

(65) Prior Publication Data
US 2014/0302344 A1 Oct. 9, 2014

Related U.S. Application Data (60) Provisional application No. 61/552,208, filed on Oct. 27, 2011.

(51) Int. Cl.
H01F 1/00 (2006.01)
H01F 10/00 (2006.01)
(Continued)

(52) U.S. Cl.
CPC ............ $H01F\ 1/344$ (2013.01); $B32B\ 37/14$ (2013.01); $H01F\ 10/20$ (2013.01); $H01F\ 10/265$ (2013.01); $H01F\ 41/16$ (2013.01); $Y10T\ 428/32$ (2015.01)

(58) Field of Classification Search
CPC . H01F 1/00; H01F 1/344; H01F 10/00; H01F 10/20; H01F 10/265; H01F 41/00; H01F 41/16; B32B 37/00; B32B 37/14
See application file for complete search history.

(56) References Cited

U.S. PATENT DOCUMENTS

2002/0081446 A1* 6/2002 Boudouris ............. B32B 27/18
428/469
2003/0183800 A1* 10/2003 Yamamoto ............. B82Y 25/00
252/62.54
(Continued)

FOREIGN PATENT DOCUMENTS

JP 2004039989 A 2/2004
JP 2007149847 * 6/2007
(Continued)

OTHER PUBLICATIONS

Tanaka, Takashi, "Sintered Ferrite Laminate, Jun. 14, 2007, Japanese Patent Office," Detailed Description.*
(Continued)

Primary Examiner — Michael N Orlando
Assistant Examiner — Matthew Hoover
(74) Attorney, Agent, or Firm — Fish & Richardson P.C.

(57) ABSTRACT

Forming a ferrite thin film laminate includes heating a layered assembly to form a laminate. The layered assembly includes a first coated substrate having a first ferrite layer opposite a first thermoplastic surface and a second coated substrate having a second ferrite layer opposite a second thermoplastic surface to form a laminate. Each coated substrate is formed by forming a ferrite layer on a surface of a
(Continued)

thermoplastic substrate. The coated substrates are arranged such that the first ferrite layer contacts the second thermoplastic surface. Heating the layered assembly includes bonding the first coated substrate to the second coated substrate such that the first ferrite layer is sandwiched between a first thermoplastic substrate and a second thermoplastic substrate. The ferrite thin film laminate may include a multiplicity of coated substrates.

37 Claims, 10 Drawing Sheets

(51) Int. Cl.
```
H01F 41/00      (2006.01)
B32B 37/00      (2006.01)
H01F 1/34       (2006.01)
H01F 10/20      (2006.01)
H01F 10/26      (2006.01)
H01F 41/16      (2006.01)
B32B 37/14      (2006.01)
```

(56) References Cited

U.S. PATENT DOCUMENTS

| | | | | |
|---|---|---|---|---|
| 2004/0078960 | A1* | 4/2004 | Roshen | B32B 7/02 29/609 |
| 2008/0224937 | A1* | 9/2008 | Kimura | C04B 35/265 343/787 |
| 2009/0302512 | A1* | 12/2009 | Gablenz | C04B 35/632 264/612 |
| 2014/0264145 | A1* | 9/2014 | Ray | H01F 1/0063 252/62.56 |

FOREIGN PATENT DOCUMENTS

| | | |
|---|---|---|
| JP | 2007149847 A | 6/2007 |
| KR | 1019910002983 | 5/1991 |
| KR | 1020110052261 | 5/2011 |
| WO | WO 2013063467 A1 | 5/2013 |

OTHER PUBLICATIONS

Ali Abou Hassan et al., "Synthesis of iron oxide nanoparticles in a microfluidic device: preliminary results in a coaxial flow millichannel," Chem. Commun., Feb. 2008, pp. 1783-1785.

Dangwei Guo et al., "Soft magnetic and high-frequency properties of Ni—Zn ferrite film with FeMn underlayer," Thin Solid Films, vol. 520, Issue 18, 2012, pp. 5977-5980.

Dangwei Guo et al., "Structural and magnetic properties of NiZn ferrite films with high saturation magnetization deposited by magnetron sputtering," Applied Surface Science, vol. 256, Issue 8, 2010, pp. 2319-2322.

W. D. Kingery et al., "Magnetic Properties—19.3 Spinel Ferrite", in: Introduction to Ceramics, 1960, New York: John Wiley and Sons, Inc., pp. 991-998.

N. Matsushita, "Spin-sprayed Ni—Zn—Co Ferrite Films with High μr > 100 in Extremely Wide Frequency Range 100MHz—1 Ghz," Journal of Applied Physics, vol. 93, No. 10, May 15, 2003, pp. 7133-7135.

Rajesh Kumar Vishwakarma, "Dual-band Stacked Rectangular Microstrip Antenna for Mobile Applications," Antenna Test and Measurement Society, Delhi, India. Feb. 2010. Pt. Ravishankar Shukla University, 2010, 3 pp.

R. Shahbender et al., "Laminate Ferrite Memory," Proceedings of Joint Computer Conference, Nov. 1963, RCA Laboratories. New York ACM New York, 1963. pp. 77-90.

Ailoor K. Subramani et al, "NiZnCo Ferrite Films by Spin Spray Technique: Morphology and Magnetic Properties." 43 J. Mat. Sci. 2372-2376 (2008).

N. Matsushita et al., "Ni—Zn Ferrite Films Synthesized from Aqueous Solution Usable for Sheet-type Conducted Noise Suppressors in GHz Range." 16 J. Electroceram 557-560 (2006).

Masanori Abe, "Ferrite Plating: A Chemical Method Preparing Oxide Magnetic Films at 24-100° C., and its Applications." 45 Electrochimica Acta 3337-3343 (2000).

Daliya S. Mathew et al., "An Overview of the Structure and Magnetism of Spinel Ferrite Nanoparticles and their Synthesis in Microemulsions." 129 Chem. Eng. J. (2007) 51-65.

G. Herzer, "Grain Size Dependence of Coercivity and Permeability in Nanocrystalline Ferromagnets," IEEE Transactions on Magnetics, vol. 26, No. 5, Sep. 1990, pp. 1397-1402.

M. Abe et al., "Phenomenological Theory of Permeability in Films Having no In-plane Magnetic Anisotropy: Application to Spin-sprayed Ferrite Films," 99 Journal of Applied Physics, 08M907, 2006, 4 pp.

Authorized officer Ho Keun Song, International Search Report and Written Opinion for PCT Application No. PCT/US2012/062221, Oct. 26, 2012,14 pp.

Ing Kong et al., "Magnetic and Microwave Absorbing Properties of Magnetite-thermoplastic Natural Rubber Nanocomposites," 322 Journal of Magnetism and Magnetic Materials, 3401-3409 (2010).

Benjamin A. Evans et al., "A Highly Tunable Silicone-based Magnetic Elastomer with Nanoscale Homogeneity," 324 Journal of Magnetism and Magnetic Materials, 501-507 (2012).

Étienne Du Trémolet De Lacheirrerie, Magnetism: Materials and Applications, pp. 192 ( New York: Springer Publishing, 2005).

Authorized officer Philippe Becamel, International Preliminary Report on Patentability for PCT Application No. PCT/US2012/062221, Apr. 29, 2014,11 pp.

* cited by examiner

THIN FILM FERRITE LAMINATION

CROSS-REFERENCE TO RELATED APPLICATIONS

This application is a U.S. National Phase Application of International Patent Application No. PCT/US2012/062221 filed Oct. 26, 2012, which claims the benefit of U.S. Application Ser. No. 61/552,208, filed on Oct. 27, 2011, the contents of both of which are incorporated herein by reference in their entirety.

TECHNICAL FIELD

This invention relates to thin film ferrite lamination and laminates formed thereby.

BACKGROUND

"Ferrite" generally refers to metal oxides having a spinel cubic crystal structure with a stoichiometry represented by $AB_2O_4$, where A and B represent different lattice sites occupied by cationic species, and O represents oxygen in its own sublattice. Thin film ferrite laminates have been formed by methods including embedding bulk ferrite into MYLAR shims and doctor blading bulk ferrite into sheets and then firing at high temperature. Ferrites have also been deposited on plastic and glass substrates to form thin films by methods including, for example, spin-spray plating, chemical solution deposition (CSD), chemical vapor deposition (CVD), plasma enhanced CVD (PECVD), physical vapor deposition (PVD), and sputtering. Certain deposition techniques, such as pulsed laser deposition and sputtering, can involve heating substrates to high temperatures (e.g., over 600° C.) to crystallize ferrite films. In some cases, ferrite thin films are weak in saturation magnetization and high in coercivity compared to bulk ferrites.

SUMMARY

In a first general aspect, a laminate is formed by heating a layered assembly including a first coated substrate having a first ferrite layer opposite a first thermoplastic surface and a second coated substrate having a second ferrite layer opposite a second thermoplastic surface such that the first ferrite layer contacts the second thermoplastic surface. A second general aspect includes a laminate formed by the first general aspect.

Implementations may include one or more of the following features. For example, the layered assembly may be formed before it is heated. Forming the layered assembly may include stacking the first coated substrate on the second coated substrate. In some cases, forming the layered assembly includes positioning the second coated substrate on the first coated substrate (e.g., stacking the second coated substrate on the first coated substrate). The layered assembly may include a multiplicity of coated substrates (e.g., more than 2, more than 10, more than 20, more than 40, etc.).

In certain cases, the first coated substrate and the second coated substrate are formed before forming the layered assembly. Forming the first coated substrate and the second coated substrate may include dividing a single coated substrate into two or more pieces to form the first coated substrate and the second coated substrate. Forming the first coated substrate and the second coated substrate may include forming the first ferrite layer on a surface of a first thermoplastic substrate and forming the second ferrite layer on a surface of the second thermoplastic substrate. Forming the first ferrite layer on the surface of the first thermoplastic substrate and forming the second ferrite layer on the surface of the second thermoplastic substrate can include depositing the ferrite of the first ferrite layer on the surface of the first thermoplastic substrate and depositing the ferrite of the second ferrite layer on the surface of the second thermoplastic substrate.

Depositing the first ferrite on the surface of the first thermoplastic substrate and depositing the second ferrite on the surface of the second thermoplastic substrate may include spin-spray plating the first ferrite on the surface of the first thermoplastic substrate and spin-spray plating the second ferrite on the surface of the second thermoplastic substrate. Forming the first coated substrate and the second coated substrate may include heating the first thermoplastic substrate and the second thermoplastic substrate to a temperature up to 100° C., up to 200° C., up to 300° C., or up to 400° C.

In some cases, the first thermoplastic substrate and the second thermoplastic substrate differ in composition. In certain cases, the first thermoplastic substrate, the second thermoplastic substrate, or both may include polyetheretherketone, polyether imide, nylon, or polyetherketoneketone.

In some cases, forming the first coated substrate and the second coated substrate includes dividing a unitary coated substrate into two or more pieces to form the first coated substrate and the second coated substrate. Forming the unitary coated substrate may include disposing ferrite on a surface of a unitary thermoplastic substrate and then cutting the unitary thermoplastic substrate to form a first coated substrate and a second coated substrate. The first coated substrate and the second coated substrate may have substantially the same dimensions. The thickness of the first coated substrate, the thickness of the second coated substrate, or both may be between 10 μm and 100 μm. In some cases, the thickness of the first ferrite layer exceeds the thickness of the first thermoplastic substrate, the thickness of the second ferrite layer exceeds the thickness of the second thermoplastic substrate, or both. The thickness of the first ferrite layer, the thickness of the second ferrite layer, or both may be between 0.1 μm and 10 μm or between 0.1 μm and 20 μm.

The first ferrite layer and the second ferrite layer may be cleaned (e.g., with water or an organic solvent) before forming the layered assembly. The layered assembly is typically compressed before it is heated. Compressing the layered assembly may include positioning the layered assembly in a press and applying pressure to the layered assembly. In some cases, heating the layered assembly includes heating to a temperature less than the glass transition temperature of the first thermoplastic substrate, the second thermoplastic substrate, or both. Heating the layered assembly may include heating the layered assembly to a temperature of at least 200° C., at least 250° C., at least 300° C., or at least 350° C. The layered assembly may be heated at a ramp rate between 5° C./min and 25° C./min. In some cases, heating the layered assembly includes thermally annealing the layered assembly. The layered assembly may be heated for at least 30 minutes; the heating may occur under a pressure less than atmospheric pressure.

The ferrite of the first ferrite layer and the ferrite of the second ferrite layer independently include nickel, zinc, cobalt, iron, copper, manganese, indium, or any combination thereof. In some cases, the ferrite of the first ferrite layer differs in composition from the ferrite of the second ferrite layer. The ferrite of the first ferrite layer and the ferrite of the second ferrite layer may each have a stoichiometry represented by $AB_2O_4$, wherein A and B represent two different lattice sites occupied by cationic species, and O represents oxygen having its own sublattice. The ferrite of the first ferrite layer and the ferrite of the second ferrite layer may have a spinel cubic crystal structure. The first ferrite layer, the second ferrite layer, or both may be magnetic.

The first ferrite layer and the second ferrite layer are typically ferrite thin films. The first ferrite layer and the second ferrite layer include nanostructures. In some cases, the nanostructures include columns with an average diameter between 20 nm and 1500 nm. An average height of the columns may be between 0.3 µm and 12 µm. The columns may include nanoparticulate structures.

These general and specific aspects may be implemented using a device, system or method, or any combination of devices, systems, or methods. The details of one or more embodiments are set forth in the accompanying drawings and the description below. Other features, objects, and advantages will be apparent from the description and drawings, and from the claims.

DETAILED DESCRIPTION

A thin film ferrite laminate is fabricated by forming a layered assembly including two or more coated substrates, each substrate having a ferrite thin film, or layer, opposite a thermoplastic surface, and heating the layered assembly to form the thin film ferrite laminate. As used herein, "ferrite" generally refers to a material of any composition having a spinel cubic crystal structure, and "coated substrate" generally refers to a substrate having a layer of material (e.g., ferrite) on a surface of the substrate. The layered assembly is formed such that a ferrite layer on a first coated substrate contacts a thermoplastic surface of a second coated substrate. In an example, the layered assembly is formed by stacking two or more coated substrates, one on top of another.

In some cases, coated substrates are formed by depositing ferrite on a larger (e.g., unitary) substrate, and dividing (e.g., cutting) the larger coated substrate to form two or more coated substrates with selected dimensions. A larger substrate may be, for example, 50 cm×50 cm. In other cases, coated substrates may be formed individually. The coated substrates used to form a layered assembly may have substantially uniform dimensions. The surface area, shape, and thickness of the substrate are not limited. In one example, a circular substrate has a diameter between 5 and 25 cm. In another example, a substrate is rectangular and has a surface area up to or greater than 1000 cm². A thickness of the coated or uncoated substrate may be in a range between 5 and 100 µm. In some cases, a thickness of one or more of the ferrite layers is between 0.1 µm and 50 µm (e.g., between 0.1 µm and 20 µm or between 1 µm and 10 µm). In certain cases, the thickness of a ferrite layer on a coated substrate exceeds the thickness of the uncoated substrate.

The composition of the substrates and/or the ferrite layers on the substrates in a layered assembly can be the same or different. The substrate is typically a thermoplastic material, such as polyetheretherketone, polyether imide, nylon, polyetherketoneketone, or the like. In an example, each ferrite layer independently includes nickel, zinc, cobalt, iron, copper, manganese, indium, or any combination thereof. A stoichiometry of each ferrite is represented by $AB_2O_4$, where A and B represent tetrahedrally and octahedrally coordinated lattice sites, respectively, occupied by cationic species, and O represents oxygen having its own sublattice. Examples of ferrites include normal spinels (e.g., $ZnFe_2O_4$), inverse spinels (e.g., $Fe(Ni,Fe)_2O_4$), mixed spinels $(Zn,Fe)(Fe,Ni)_2O_4$), disordered spinels $(Ni,Zn,Fe)(Ni,Zn,Fe)_2O_4$, and conductive spinels $(Fe^{2+},Fe^{3+})(Fe^{2+},Fe^{3-})_2O_4$. In addition to zinc ferrite ($ZnFe_2O_4$), other particular examples include nickel ferrite ($NiFe_2O_4$), cobalt ferrite ($CoFe_2O_4$), nickel zinc ferrite [$(Ni-Zn)Fe_2O_4$], nickel zinc cobalt ferrite [$(Ni-Zn-Co)Fe_2O_4$], manganese ferrite ($MnFe_2O_4$), and manganese zinc ferrite [$(Mn-Zn)Fe_2O_4$]. In some cases, one or more of the ferrite layers is magnetic. The composition of a spinel, or a combination of spinels, may be selected to achieve desired magnetic and/or electrical properties in the ferrite layer.

Figure 1A:
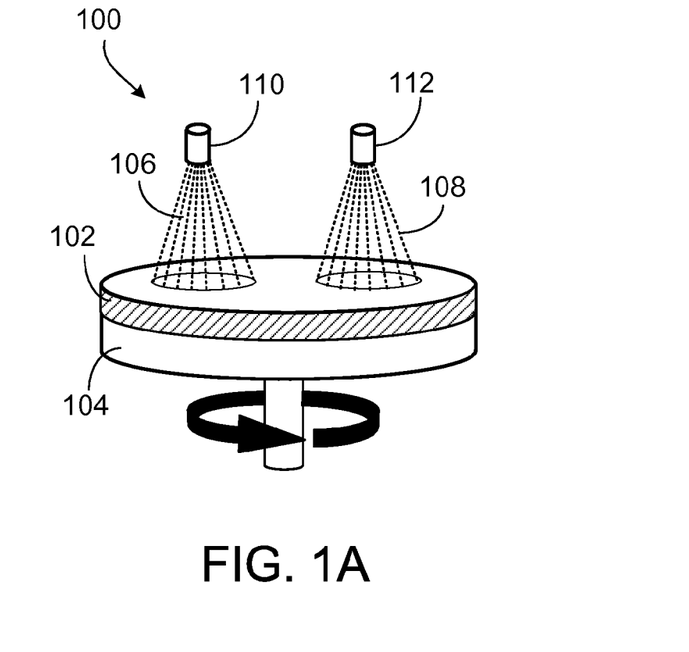
FIG. 1A shows an apparatus for forming a ferrite layer on a substrate.

A ferrite layer is deposited on the substrate to form a coated substrate. Deposition may include, for example, spin-spray plating a ferrite on the surface of a substrate. FIG. 1A depicts apparatus 100 for spin-spray plating a ferrite on the surface of a substrate. During deposition of the ferrite, substrate 102 may be heated on rotating platform 104, as shown. Metals solution (reactant) 106 and oxidizer solution (oxidant) 108 are provided to substrate 102 via dispensers 110 and 112, respectively. As known in the art, the metals solution is an aqueous solution including two or more salts, such as chlorides of iron, nickel, zinc, cobalt, copper, manganese, indium, or other metal with a valence of two. In some cases, the total concentration of metal salt in the aqueous metal salt solution is in a range between 5 and 50 mM (e.g., 25 mM). The oxidizer solution is typically an aqueous solution of an oxidizing agent (e.g., sodium nitrite) and a buffer solution (e.g., glacial acetic acid and ammonium hydroxide). The composition and concentration of the buffer solution may be selected based on the components of the metal salt solution and the desired properties of the resulting ferrite. Providing the reactant and oxidant can include atomizing liquid droplets, thereby promoting a more uniform temperature on the substrate.

The rotation rate, pH, fluid flow, and temperature may be adjusted to achieve a desired spinel nanostructure. In an example, a thermoplastic substrate is mounted on an 8" disc rotating at 60 rpm. The platform on which the substrate is positioned is heated to a temperature up to 100° C., up to 200° C., or up to 300° C. (e.g., 90° C.). The flow rate of the reactant and the oxidant can be automated at a selected rate (e.g., between 5 mL/min and 100 mL/min, or in some cases about 55 mL/min). The rotation rate and platen temperature may be monitored.

Figure 1B:
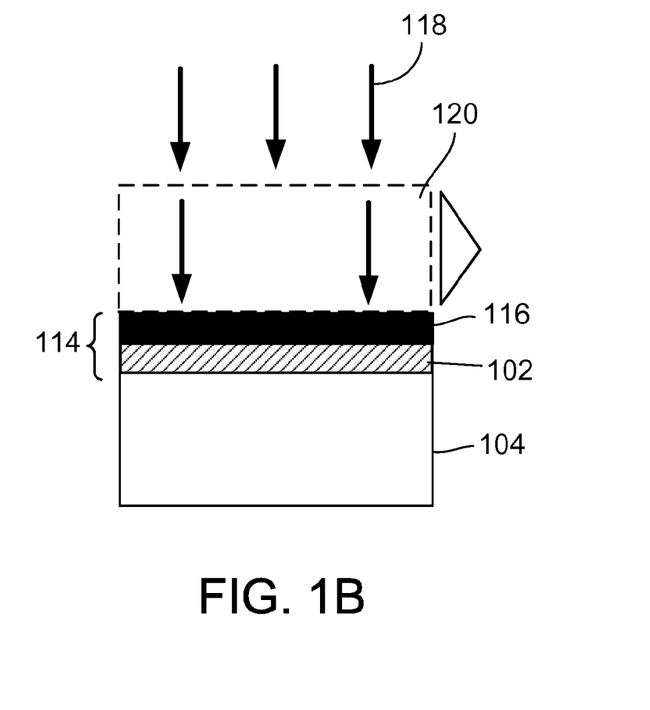
FIG. 1B illustrates the coating process that occurs using the apparatus shown in FIG. 1A.

FIG. 1B depicts the formation of coated layer 114 including ferrite layer 116 on substrate 102. Ferrite layer 116 is formed when metals solution 106 and oxidizer solution 108, shown as spray flux 118, form region 120 in which diffusing reactants are heated to form the ferrite layer. Fluid flow is indicated by arrow 122. The flow rate may be increased or maximized by increasing the pH of the oxidant or optimizing fluid flow. In some cases, one or more intervening layers (e.g., adhesion layers or the like) may be present between substrate 102 and ferrite layer 116. In certain cases, the substrate may be treated to improve wetting of the substrate surface by the diffusing reactants by methods generally known in the art to increase the hydrophilicity of a surface, such as plasma treatment. A contact angle of the aqueous reactant on the surface of the substrate may be between 10° and 40° (e.g., between 20° and 30°).

Figure 2A:
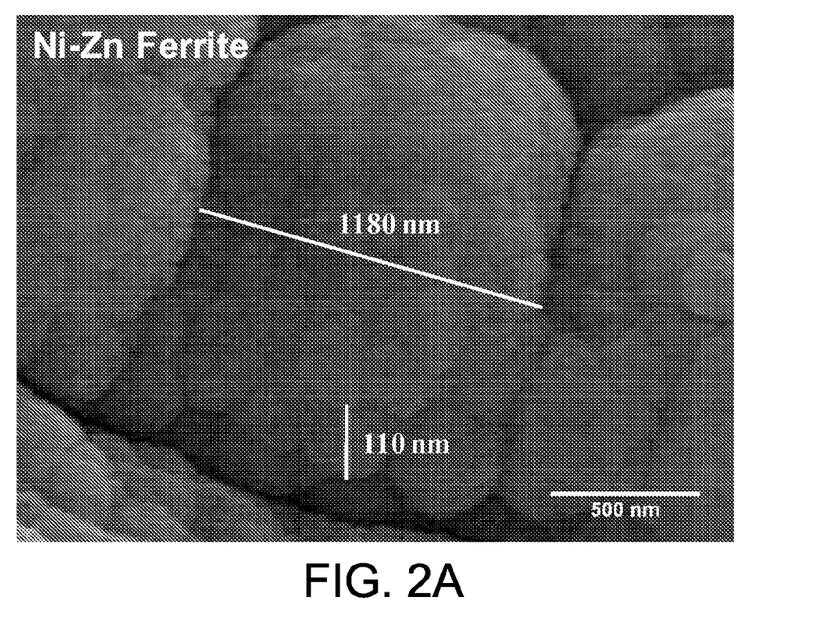
FIGS. 2A through D show Field Emission Scanning Electron Microscopy (FESEM) images of nanostructured ferrite layers formed by a process described herein.
Figure 2B:
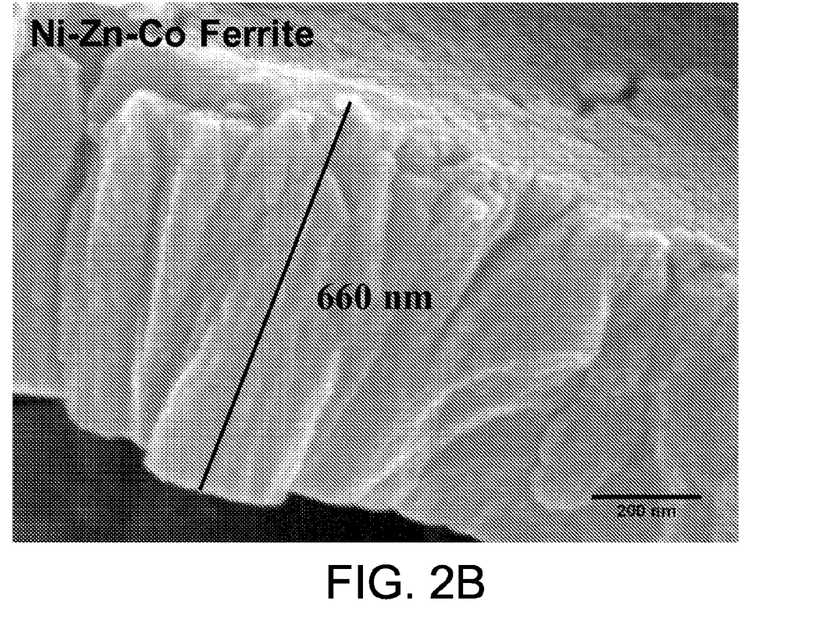
Figure 2C:
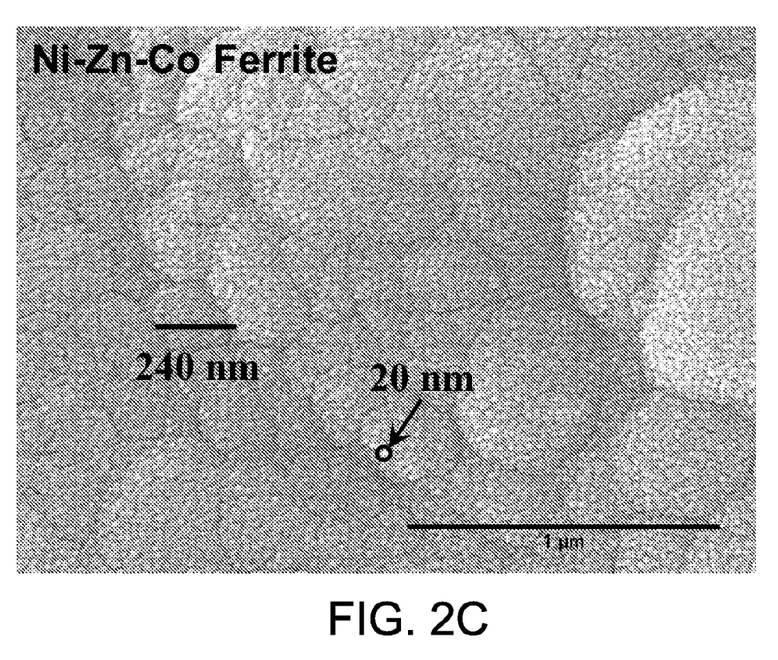
Figure 2D:
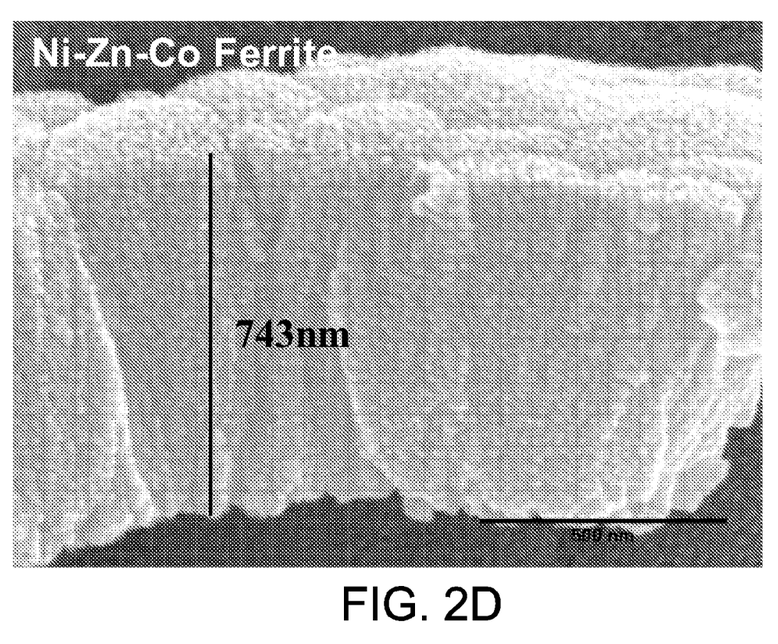

Ferrite layers formed as described herein typically include nanostructures. The nanostructures may be in the form of columns. In an example, an average diameter of the columns is between 20 nm and 1500 nm (e.g., between 20 nm and 1200 nm). In another example, an average height of the columns is between 0.3 µm and 12 µm. FIG. 2A is a FESEM image of a Ni—Zn thin film ferrite formed as described herein, with a column diameter of about 1180 nm. FIGS. 2B-2D are FESEM images of Ni—Zn—Co thin film ferrites formed as described herein. FIGS. 2B and 2D show a column height of about 660 nm and about 743 nm, respectively. FIG. 2C shows a column diameter of about 240 nm. Nanoparticulate texturing is seen in FIGS. 2C and 2D. FIG. 2C shows nanoparticulate texturing with a nanoparticle diameter ranging from about 5 nm to 50 nm. Nanoparticulate texturing of about 20 nm is indicated.

Figure 3A:
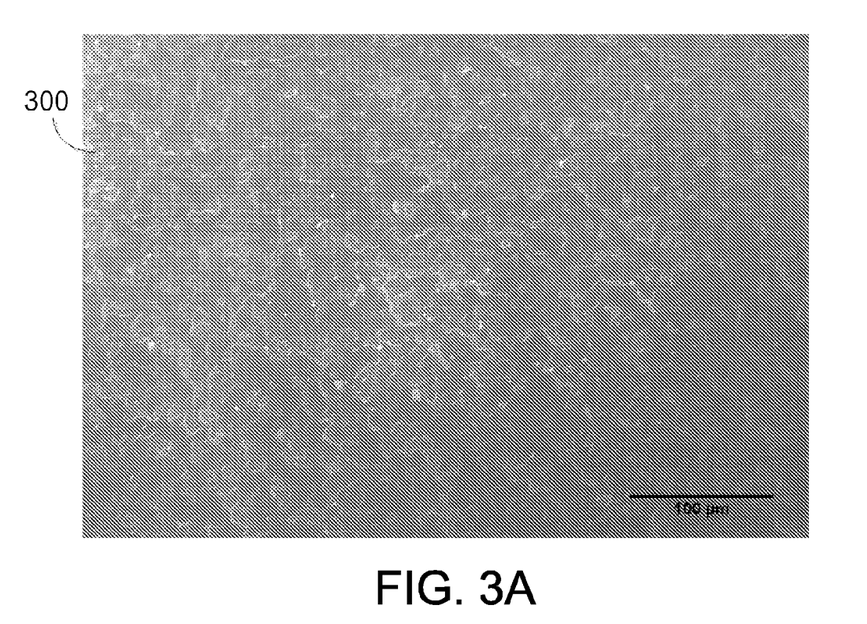
FIGS. 3A and 3B show FESEM images of nanostructured ferrite layers formed by a process described herein.
Figure 3B:
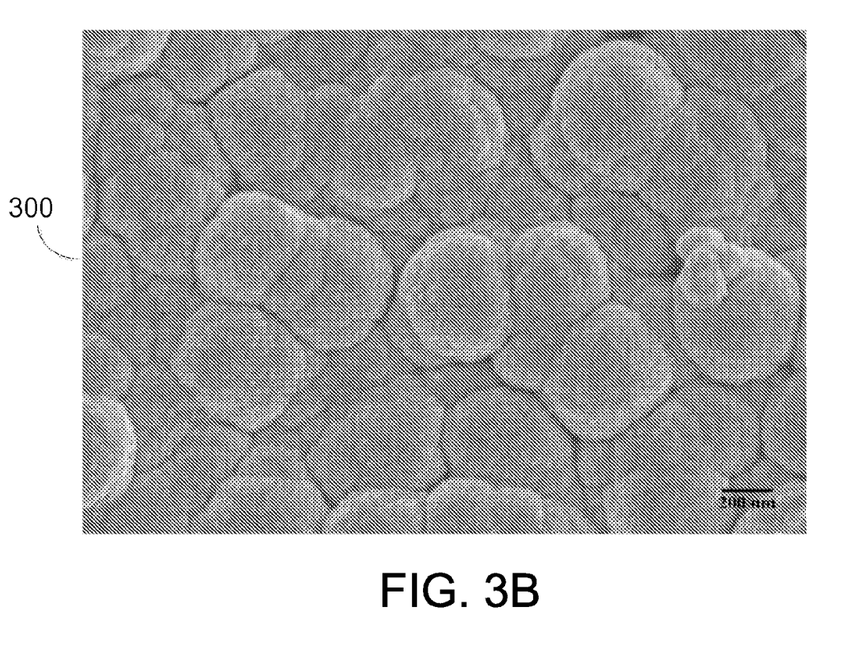

FIGS. 3A and 3B are FESEM images of an example of a thin film ferrite 300 with a composition of $Ni_xZn_yFe_{3-x-y}O_4$, where x is 0.19 to 0.51 and y is 0.10 to 0.43. Ferrites with this composition can be formed, for example, with deposition microstructures having a diameter of 14±3.7 nm, columnar texturing in a range of 10 nm to 200 nm, film thicknesses of 0.35-7.85 µm, and deposition rates as high as 62 nm/min.

Figure 4A:
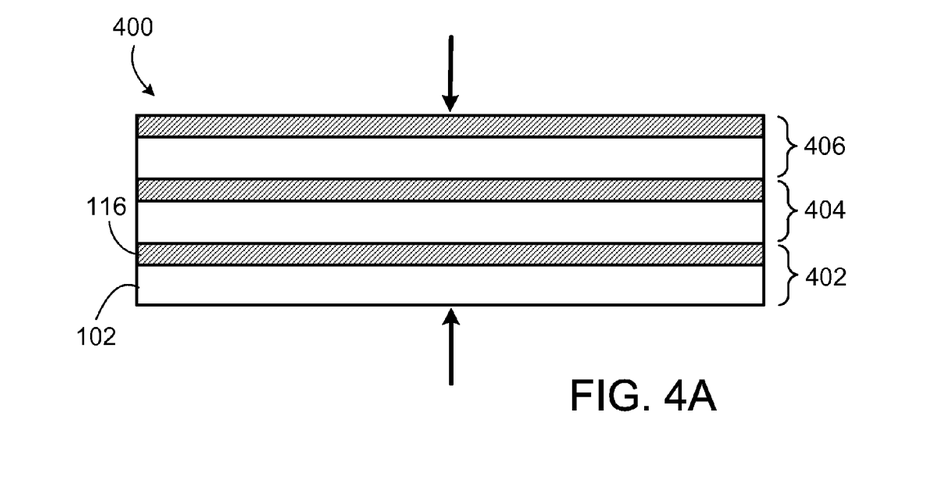
FIG. 4A depicts compression of a layered assembly.
Figure 4B:
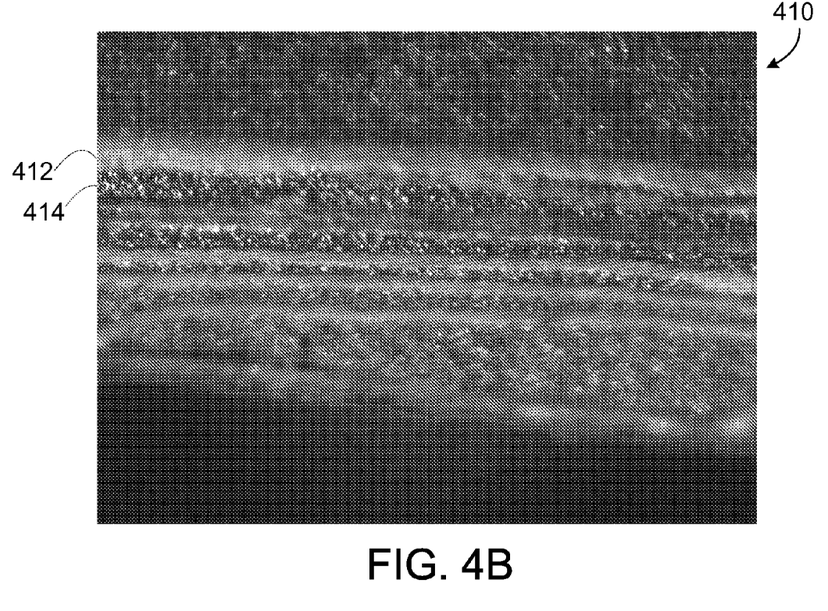
FIG. 4B is a FESEM image of a layered assembly.

In some cases, the ferrite layer of a coated substrate is cleaned (e.g., with an organic solvent or water) before the coated substrate is used to form a layered assembly. A number of coated layers (e.g., at least 2 and less than 100) are stacked to form a layered assembly, such that the ferrite layer of one coated substrate is in contact with the substrate of another coated substrate. FIG. 4 shows layered assembly 400 including ferrite coated thermoplastic substrates 402, 404, and 406. Each coated substrate 402, 404, and 406 includes substrate 102 and ferrite layer 116. Substrates 102 and ferrite layers 116 may be the same or different. The vertical arrows indicate compression of coated substrates 402, 404, and 406. In some cases, the top thermoplastic substrate may be uncoated, so that ferrite is not exposed on the top surface. FIG. 4B as a FESEM image of a cross section of layered assembly 410 formed as described herein, with substrate layers 412 and ferrite layers 414.

Figure 5A:
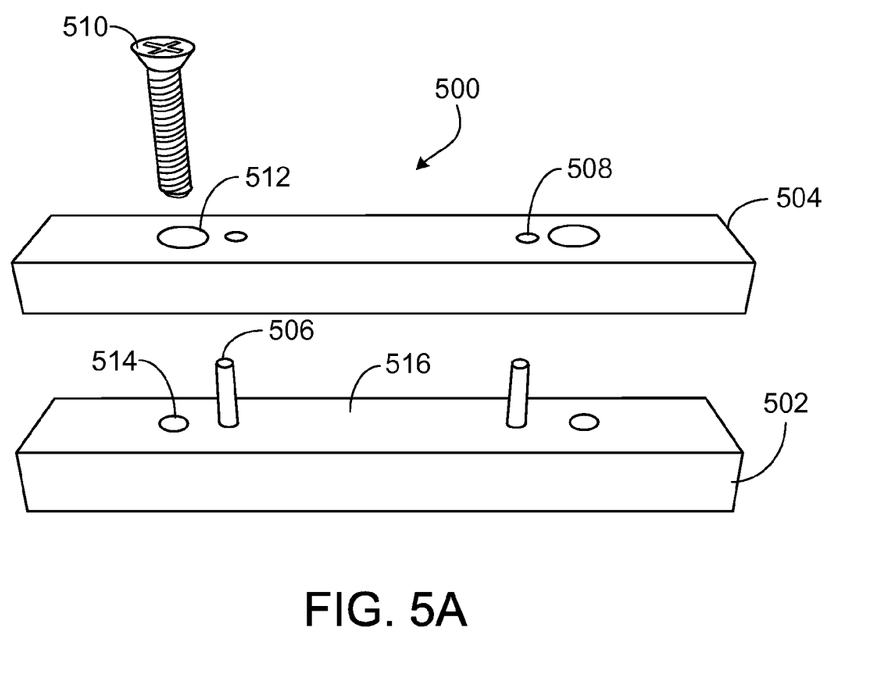
FIGS. 5A and 5B show holders for compressing layered assemblies.

Compressing the layered assembly may include positioning the layered assembly in a press and applying pressure to the layered assembly, forcing the coated substrates together. FIG. 5A depicts an exploded view of press 500 for compressing a layered assembly. The press may include first portion 502 and second portion 504. Portions 502 and 504 may be made from metal in the form of, for example, a metal bar or plate. A layered assembly may be positioned between the aligning members 506 protruding from first portion 502 of holder 500. Openings 508 in second portion 504 of press 500 may be aligned with the aligning members 506, coupling first portion 502 and second portion 504 of holder 500. Pressure may be applied to the layered assembly by securing first portion 502 and second portion 504 via coupling members 510 (e.g. screws or the like) through openings 512 and 514. In some cases, each coupling members 510 is tightened to achieve a pressure of about 40 N. In one example, surface 516 of first portion 502 has dimensions of about 1"×6", and a thickness of the first portion is about ½".

Figure 5B:
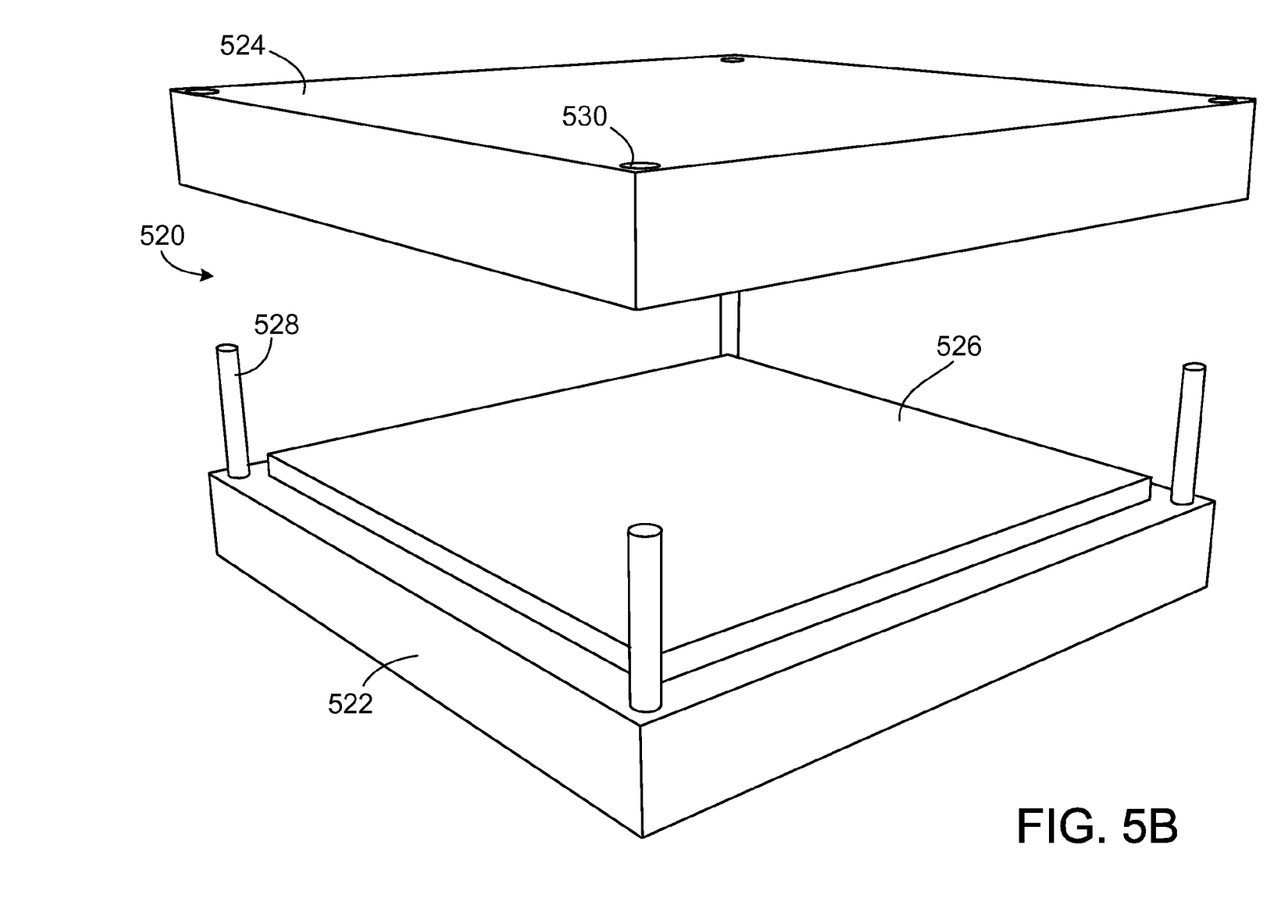

FIG. 5B depicts an exploded view of press 520 for compressing a layered assembly. Press 520 includes first portion 522 and second portion 524. First portion 522 has plateau 526. Portions 522 and 524 may be made of metal in the form of, for example, a metal plate. A layered assembly may be positioned on plateau 526 between the aligning members 528 protruding from first portion 522 of press 520. Openings 530 in second portion 524 of press 520 may be aligned with the aligning members 528, coupling first portion 522 and second portion 524 of press 520. Pressure may be applied to the layered assembly by securing first portion 522 and second portion 524 via coupling members as described with respect to FIG. 5A. In some cases, pressure is applied to the layered assembly by a separate device (e.g., a weight or a vise). In one example, plateau of first portion 522 has dimensions of about 3.5"×3.5", second portion 523 has dimensions of about 4"×4", and the first portions and second portions have a thickness of about ½". In other examples, press 520 is sized to accommodate layered assemblies with larger dimensions.

Presses of other configurations designed to compress coated substrates in a layered assembly may also be used. In some cases, one or more interior surfaces of a press may include a release agent or layer arranged to promote clean release of a thin film ferrite laminate from the press. After a layered assembly is assembled in a press, the press (and the layered assembly therein) is heated to a temperature less than the transition temperature of one or more of the substrates in the layered assembly. Heating may be achieved in a furnace, such as a tube furnace, by positioning the press in the furnace tube, capping the furnace tube with an input for a vacuum tube, and evacuating the furnace tube. In some cases, properties of the ferrite thin film may be enhanced by heating the layered assembly in a ceramic tube under vacuum. The layered assembly then undergoes a thermal annealing cycle. The temperature is ramped up to 200° C., up to 250° C., up to 300° C., up to 350° C., or up to 400° C. The layered assembly may be heated at a ramp rate between 5° C./min and 25° C./min. In one example, a layered assembly is heated to a temperature of at least 200° C., at least 250° C., at least 300° C., or at least 350° C. (e.g., between 300° C. and 400° C.). After achieving the desired temperature, the layered assembly may be heated for at least 30 minutes or at least 1 hour. In some cases, the layered assembly is heated up to 3 hours or more. In certain cases, the layered assembly is heated under a pressure less than atmospheric pressure. After heating for the desired time, the annealed layered assembly is left to cool down without disturbance.

Figure 6A:
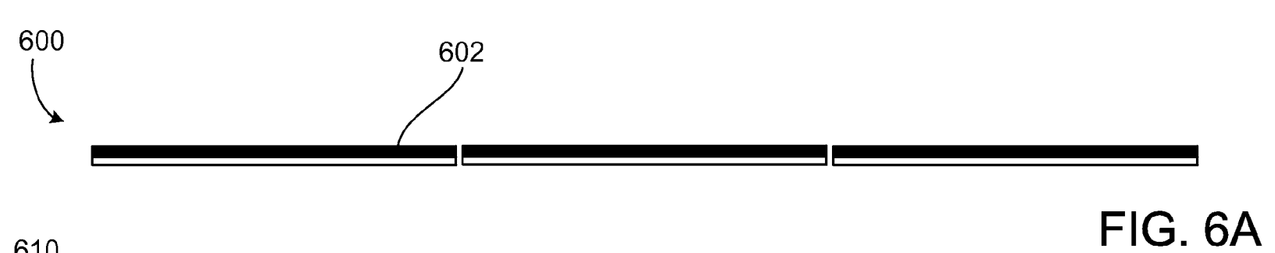
FIGS. 6A through 6C show patterned laminates that can be formed by a process described herein.
Figure 6B:
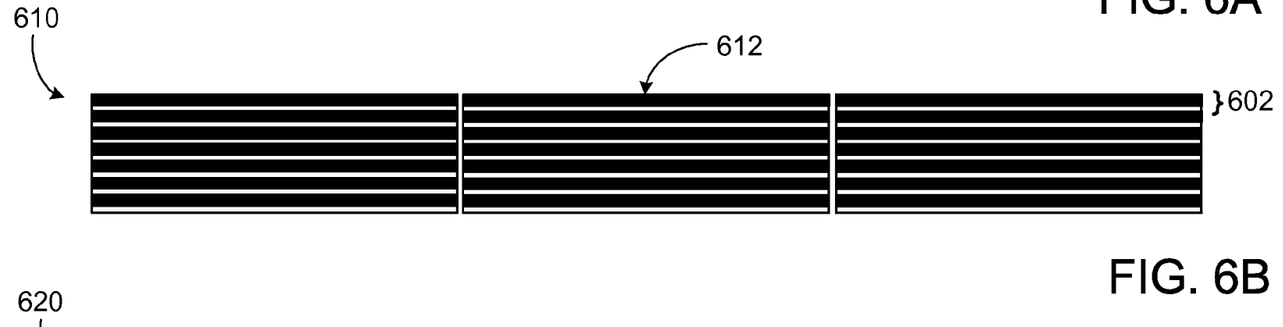
Figure 6C:
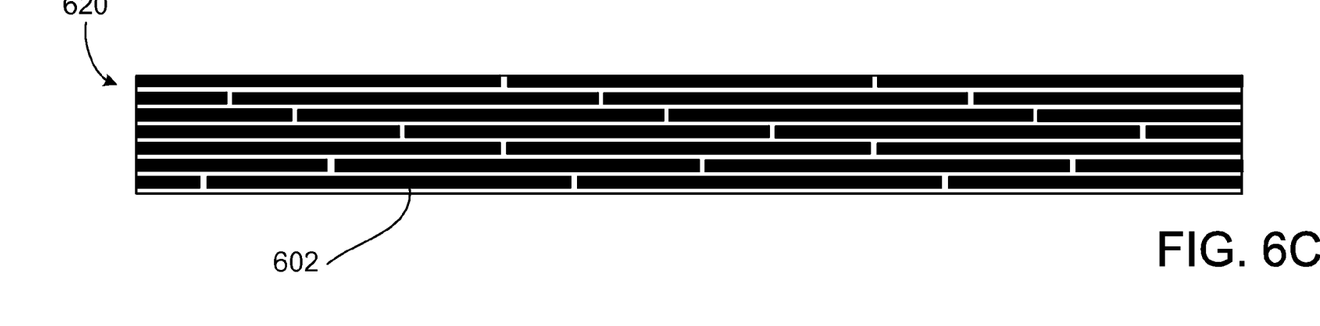

FIGS. 6A-6C show laminate patterns that can be formed in the process described herein. FIG. 6A shows a cut ply laminate pattern 600 including coated substrates 602. FIG. 6B shows a mosaic tiling laminate pattern 610 including columns 612 of coated substrates 602. FIG. 6C shows a laminate pattern 620 including overlapping plies, with each layer including multiple coated substrates 602 aligned end to end, such that ends of coated substrates in a first are not aligned with ends of coated substrates in an overlying ply.

Advantages of the low temperature processes described herein include the use of plastic substrates, including plastic substrates unsuitable for high temperature processes, to form thin film ferrite laminates and patterned laminates in a range of sizes. Depending on the raw material composition and processing conditions, thin film ferrite laminates formed as described herein have good adhesion and low water absorption, and exhibit a wide array of properties, including high complex permeabilities, relatively high resistivity, low losses, and high resonance frequencies. Thin film ferrite laminates with high permeabilities (e.g., in the gigahertz range) formed as described herein may be used as radiation absorbing layer on plastic circuit boards to reduce electromagnetic interference. Other applications include miniaturized low-microwave inductors, antennas (e.g., wireless and mobile applications, as well as dual- and tri-band antennas in global positioning systems (GPS) and synthetic aperture radar (SAR)), and high-density perpendicular recording arrays, semiconductor devices, and magnetic sensors. Advantages of the thin film ferrite laminates formed as described herein include light weight, low volume, low cost, and large-scale production, as well as flexible design, low sensitivity to manufacturing tolerances, and easy installation. For GPS and SAR antennas, for example, thin film ferrite laminates would allow replacement of separate antennas used in dual- or tri-band antennas with a unitary antenna construction.

EXAMPLES

Example 1

(Ni—Zn—Co)$_x$Fe$_{3-x}$O$_4$ (0.3≤x≤1) was spin-spray plated onto VITREX APTIV PEEK substrate, 25.4 μm thick, at 90° C. After deposition, the ferrite was washed thoroughly with deionized water. The layered substrate was cut into 1"×1" squares, and 40 of the 1"×1" squares were stacked to form a layered assembly. The layered assembly was placed in a press consisting of two aluminum bars. The bars were screwed together, one screw on each end, to achieve a pressure of about 40 N on each screw, thus holding the layered substrates stationary with respect to each other. The press was placed into a tube furnace. The temperature was ramped 15° C./minute, and the layered assembly was heated at 350° C. for two hours. After heating, the laminate in the holder was allowed to cool without disturbance.

Figure 7:
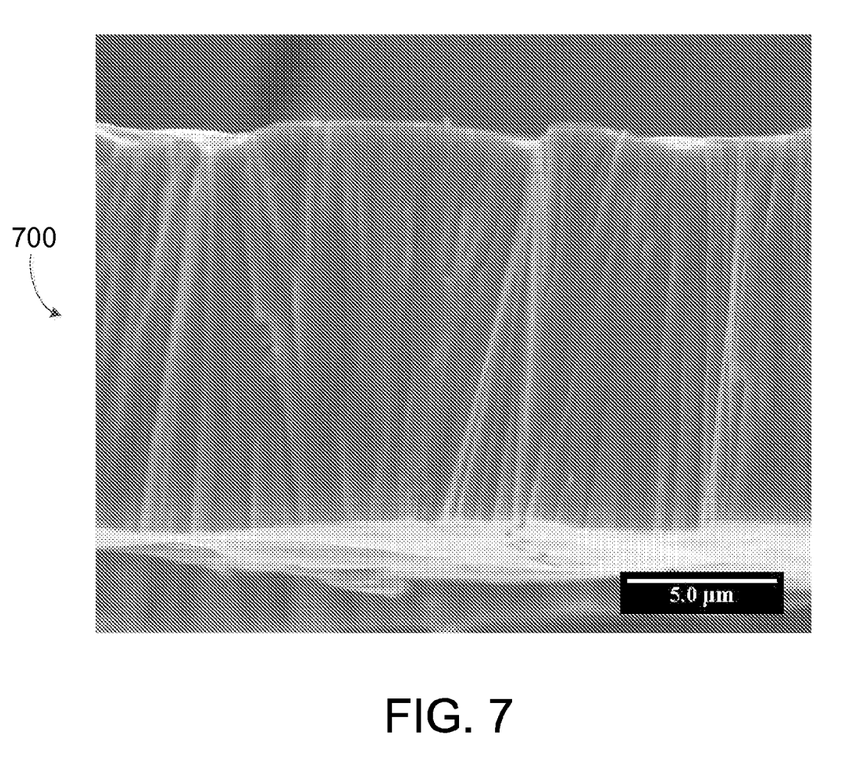
FIG. 7 is a scanning electron microscopy (SEM) image of Ni—Zn—Co ferrite.
Figure 8A:
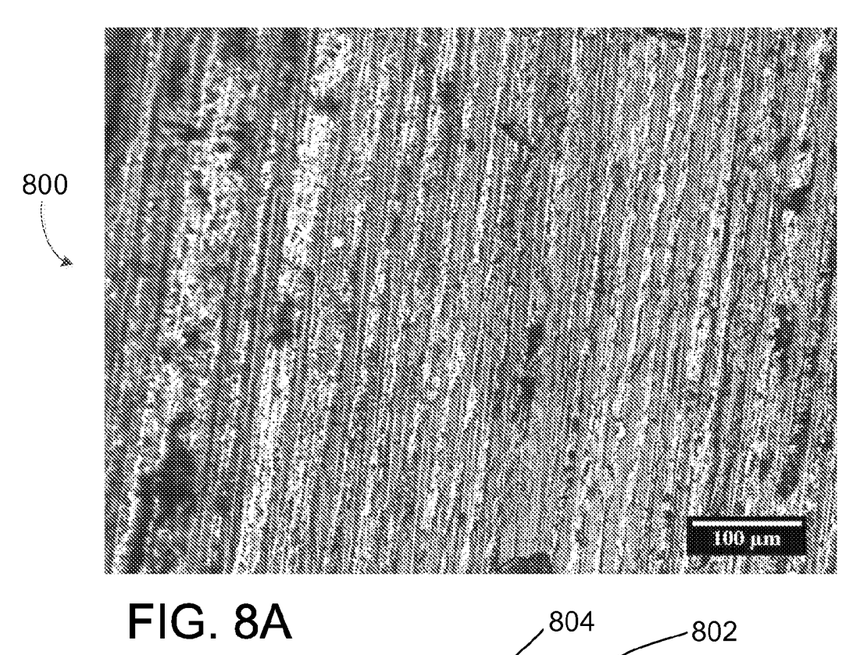
FIGS. 8A and 8B are optical microscopy images of a Ni—Zn—Co ferrite laminate.
Figure 8B:
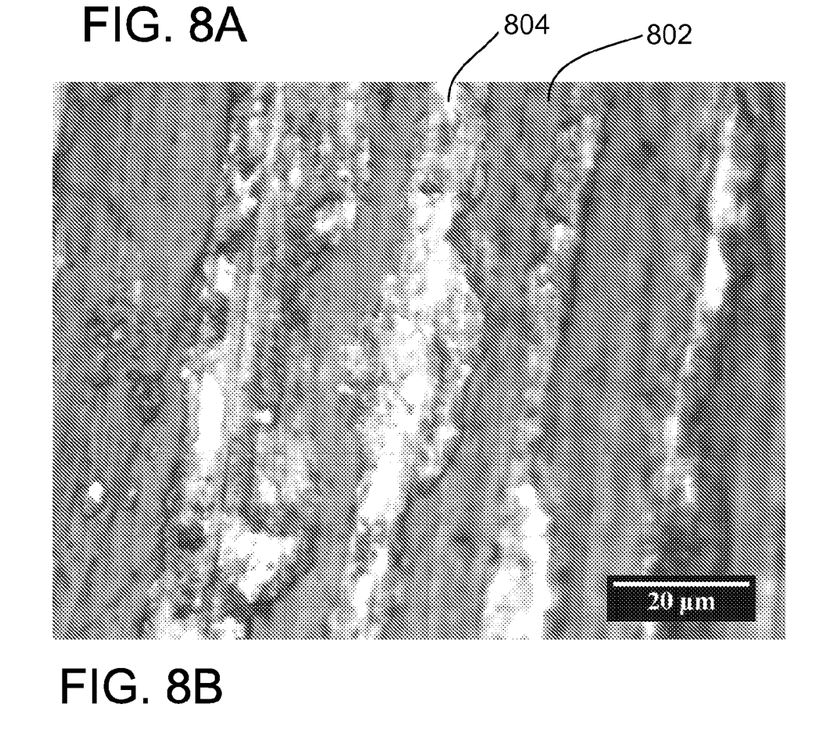

FIG. 7 is an SEM image of Ni—Zn—Co ferrite 700 formed by a spin-spray process similar to that described in Example 1. The columnar structure of the ferrite is visible in the image. FIGS. 8A and 8B are optical microscopy images of a 1"×1"×0.62" laminate 800 constructed of Ni—Zn—Co ferrite deposited onto a PEEK substrate using a spin-spray process and lamination process similar to that described in Example 1. Ferrite layers 802 and substrate layers 804 in the laminate are seen in FIG. 8B.

Example 2

(Ni—Zn)$_x$Fe$_{3-x}$O$_4$ (0.3≤x≤1) was spin-spray plated onto VITREX APTIV PEEK substrate, 25.4 μm thick, at 90° C. After deposition, the ferrite was washed thoroughly with deionized water. The layered substrate was cut into 1"×0.354" squares, and 10 of the 1"×0.354" squares were stacked to form a layered assembly. The layered assembly was placed in a press consisting of two aluminum bars. The bars were screwed together, one screw on each end, to achieve a pressure of about 40 N on each screw, thus holding the layered substrates stationary with respect to each other. The holder was placed into a tube furnace. The temperature was ramped 15° C./minute, and the layered assembly was heated at 350° C. for two hours. After heating, the laminate in the holder was allowed to cool without disturbance.

Other Examples

The experiments in Examples 1 and 2 were repeated by following the same procedure with different spinel ferrites, including Ni—Zn ferrite and other spinel ferrites having an AB$_2$O$_4$ crystal structure. The size of the samples and number of layers were varied, with laminate thicknesses ranging from about 20 μm to about 350 μm.

A number of embodiments have been described. Nevertheless, various modifications may be made without departing from the spirit and scope of the disclosure. Accordingly, other embodiments are within the scope of the following claims.

What is claimed is:

1. A method comprising:
    heating a layered assembly to form a laminate, the layered assembly comprising:
        a first coated substrate having a first ferrite layer opposite a first thermoplastic surface; and
        a second coated substrate having a second ferrite layer opposite a second thermoplastic surface,
        wherein the first ferrite layer and the second ferrite layer comprise nanostructures, and the nanostructures comprise columns, and
        wherein the first ferrite layer contacts the second thermoplastic surface.

2. The method of claim 1, further comprising forming the layered assembly before heating the layered assembly.

3. The method of claim 2, wherein forming the layered assembly comprises stacking the first coated substrate on the second coated substrate.

4. The method of claim 2, wherein forming the layered assembly comprises positioning the second coated substrate on the first coated substrate.

5. The method of claim 1, wherein the first coated substrate and the second coated substrate have substantially the same dimensions.

6. The method of claim 1, wherein a thickness of the first coated substrate, a thickness of the second coated substrate, or both is between 10 μm and 100 μm.

7. The method of claim 2, further comprising forming the first coated substrate and the second coated substrate before forming the layered assembly.

8. The method of claim 7, wherein forming the first coated substrate and the second coated substrate comprises dividing a single coated substrate into two or more pieces to form the first coated substrate and the second coated substrate.

9. The method of claim 7, wherein the first thermoplastic surface is a surface of a first thermoplastic substrate and the second thermoplastic surface is a surface of a second thermoplastic substrate, and forming the first coated substrate and the second coated substrate comprises forming the first ferrite layer on the first thermoplastic surface, and forming the second ferrite layer on the second thermoplastic surface, respectively.

10. The method of claim 9, wherein forming the first ferrite layer on the first thermoplastic surface and forming the second ferrite layer on the second thermoplastic surface comprises depositing the ferrite of the first ferrite layer on the first thermoplastic surface and depositing the ferrite of the second ferrite layer on the second thermoplastic surface, respectively.

11. The method of claim 10, wherein depositing the first ferrite on the first thermoplastic surface and depositing the second ferrite on the second thermoplastic surface comprises spin-spray plating the first ferrite on the first thermoplastic surface and spin-spray plating the second ferrite on the second thermoplastic surface, respectively.

12. The method of claim 9, wherein forming the first coated substrate and the second coated substrate comprises heating the first thermoplastic substrate and the second thermoplastic substrate, respectively, to a temperature up to 100° C., up to 200° C., up to 300° C., or up to 400° C.

13. The method of claim 9, wherein the first thermoplastic substrate and the second thermoplastic substrate differ in composition.

14. The method of claim 7, wherein forming the first coated substrate and the second coated substrate comprises dividing a unitary coated substrate into two or more pieces to form the first coated substrate and the second coated substrate.

15. The method of claim 14, wherein forming the unitary coated substrate comprises disposing ferrite on a surface of a unitary thermoplastic substrate and then cutting the unitary thermoplastic substrate to form a first coated substrate and a second coated substrate.

16. The method of claim 1, further comprising cleaning the first ferrite layer and the second ferrite layer before forming the layered assembly.

17. The method of claim 1, further comprising compressing the layered assembly before heating the layered assembly.

18. The method of claim 17, wherein compressing the layered assembly comprises positioning the layered assembly in a press and applying pressure to the layered assembly.

19. The method of claim 9, wherein the first thermoplastic substrate, the second thermoplastic substrate, or both comprise polyetheretherketone, polyether imide, nylon, or polyetherketoneketone.

20. The method of claim 9, wherein heating the layered assembly comprises heating the layered assembly to a temperature less than the glass transition temperature of the first thermoplastic substrate, the second thermoplastic substrate, or both.

21. The method of claim 1, wherein heating the layered assembly comprises heating the layered assembly to a temperature of at least 200° C., at least 250° C., at least 300° C., or at least 350° C., and less than 400° C.

22. The method of claim 1, wherein heating the layered assembly comprises heating the layered assembly for at least 30 minutes.

23. The method of claim 1, wherein heating the layered assembly comprises heating the layered assembly at a ramp rate between 5° C./min and 25° C./min.

24. The method of claim 1, wherein heating the layered assembly comprises thermally annealing the layered assembly.

25. The method of claim 1, wherein heating the layered assembly comprises heating the layered assembly under a pressure less than atmospheric pressure.

26. The method of claim 1, wherein the layered assembly comprises a multiplicity of coated substrates.

27. The method of claim 26, wherein the multiplicity of coated substrates comprises more than two coated substrates.

28. The method of claim 1, wherein the ferrite of the first ferrite layer and the ferrite of the second ferrite layer independently comprise nickel, zinc, cobalt, iron, copper, manganese, indium, or any combination thereof.

29. The method of claim 1, wherein the ferrite of the first ferrite layer differs in composition from the ferrite of the second ferrite layer.

30. The method of claim 1, wherein the ferrite of the first ferrite layer and the ferrite of the second ferrite layer each has a stoichiometry represented by $AB_2O_4$, wherein A and B represent two different lattice sites occupied by cationic species, and O represents oxygen having its own sublattice.

31. The method of claim 1, wherein the ferrite of the first ferrite layer and the ferrite of the second ferrite layer each has a spinel cubic crystal structure.

32. The method of claim 1, wherein the first ferrite layer and the second ferrite layer are ferrite thin films.

33. The method of claim 1, wherein the nanostructures comprise columns with an average height between 0.3 μm and 12 μm, an average diameter between 20 nm and 1500 nm, or both.

34. The method of claim 1, wherein the columns comprise nanoparticulate structure.

35. The method of claim 9, wherein a thickness of the first ferrite layer exceeds a thickness of the first thermoplastic substrate, a thickness of the second ferrite layer exceeds a thickness of the second thermoplastic substrate, or both.

36. The method of claim 9, wherein a thickness of the first ferrite layer, a thickness of the second ferrite layer, or both is between 0.1 μm and 10 μm or between 0.1 μm and 20 μm.

37. The method of claim 1, wherein the first ferrite layer, the second ferrite layer, or both are magnetic.

* * * * *

UNITED STATES PATENT AND TRADEMARK OFFICE
CERTIFICATE OF CORRECTION

| | | |
|---|---|---|
| PATENT NO. | : 9,627,117 B2 | |
| APPLICATION NO. | : 14/354409 | |
| DATED | : April 18, 2017 | |
| INVENTOR(S) | : William T. Petuskey and Nicole M. Ray | |

It is certified that error appears in the above-identified patent and that said Letters Patent is hereby corrected as shown below:

On the Title Page

Column 1, Applicant (71), Line 1, delete "ARIZONA BOARD OF REGENTS" insert -- ARIZONA BOARD OF REGENTS, A BODY CORPORATE OF THE STATE OF ARIZONA ACTING FOR AND ON BEHALF OF ARIZONA STATE UNIVERSITY --.

Signed and Sealed this
Twenty-seventh Day of February, 2024

Katherine Kelly Vidal
*Director of the United States Patent and Trademark Office*